March 12, 1963 D. A. MURRAY ETAL 3,080,666
LAND LEVELER
Filed Nov. 9, 1960 5 Sheets-Sheet 1
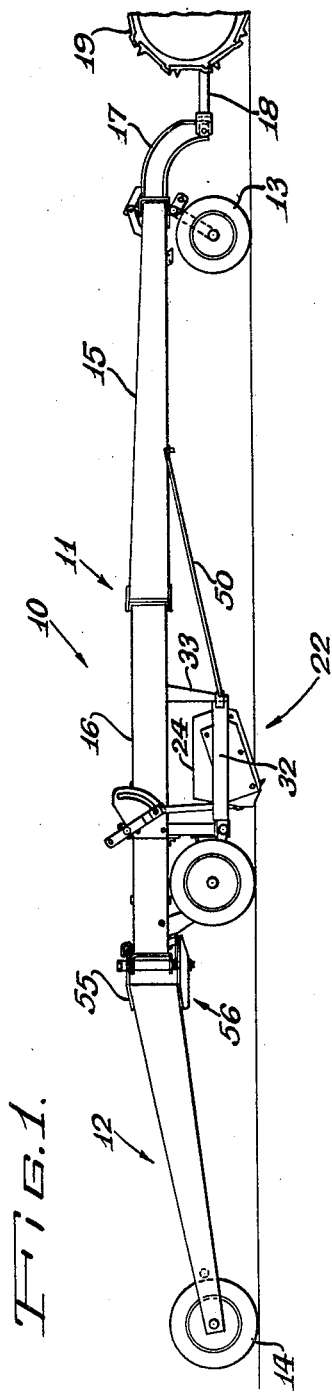
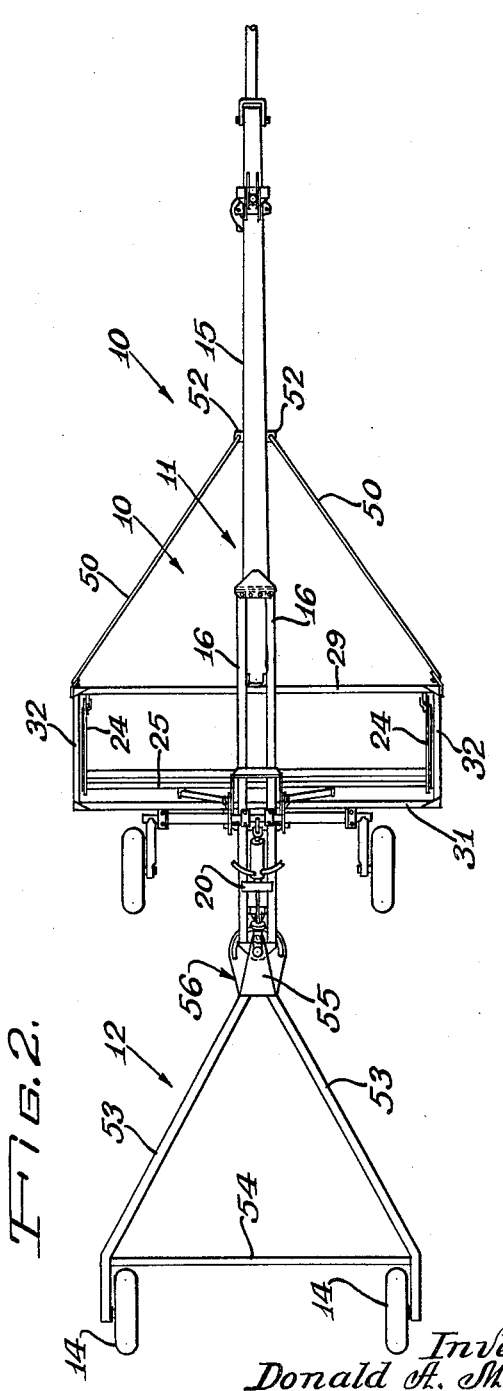
Inventors:
Donald A. Murray
Charles F. Crumb
Paul O. Pipped Atty.

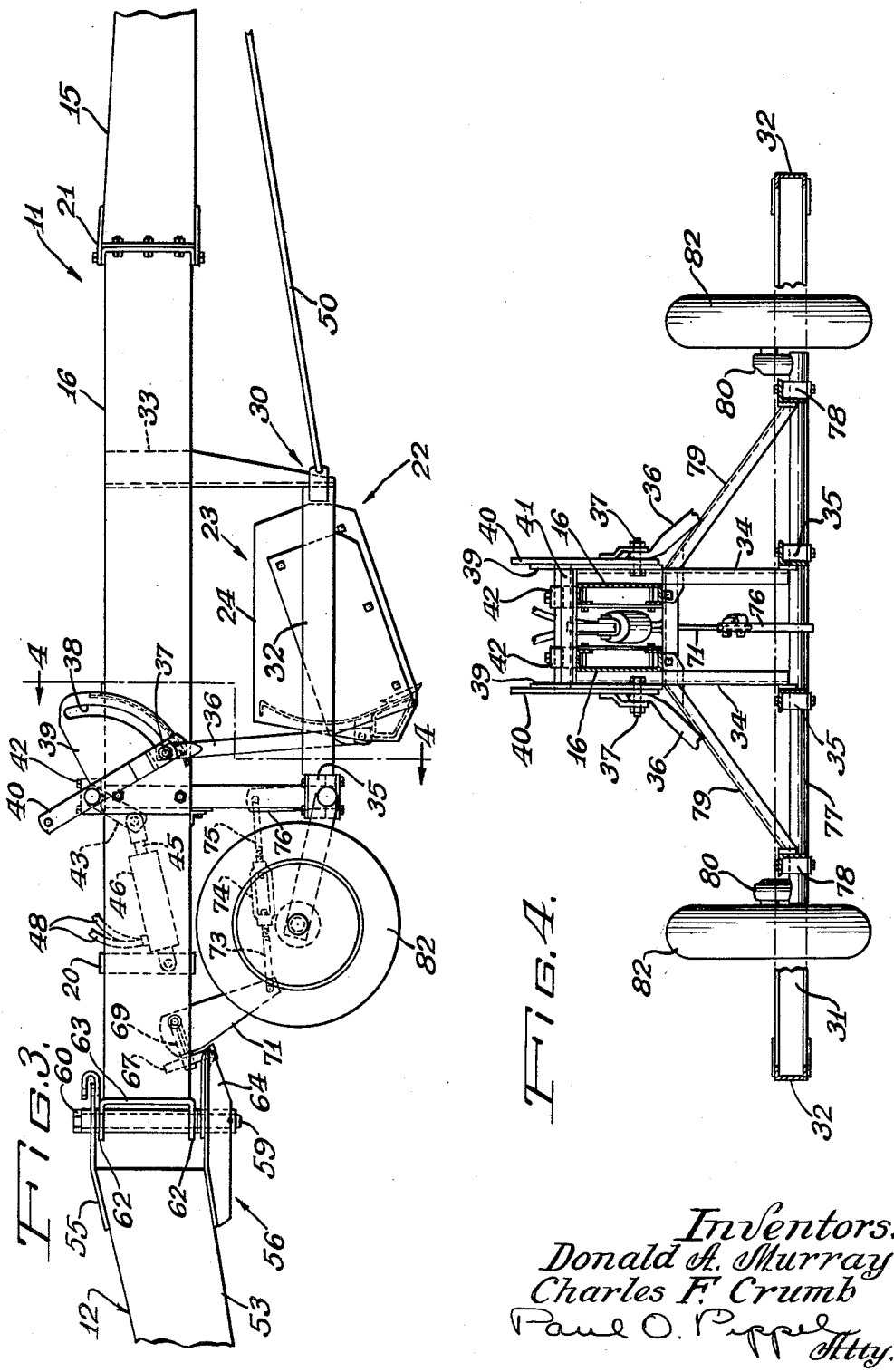

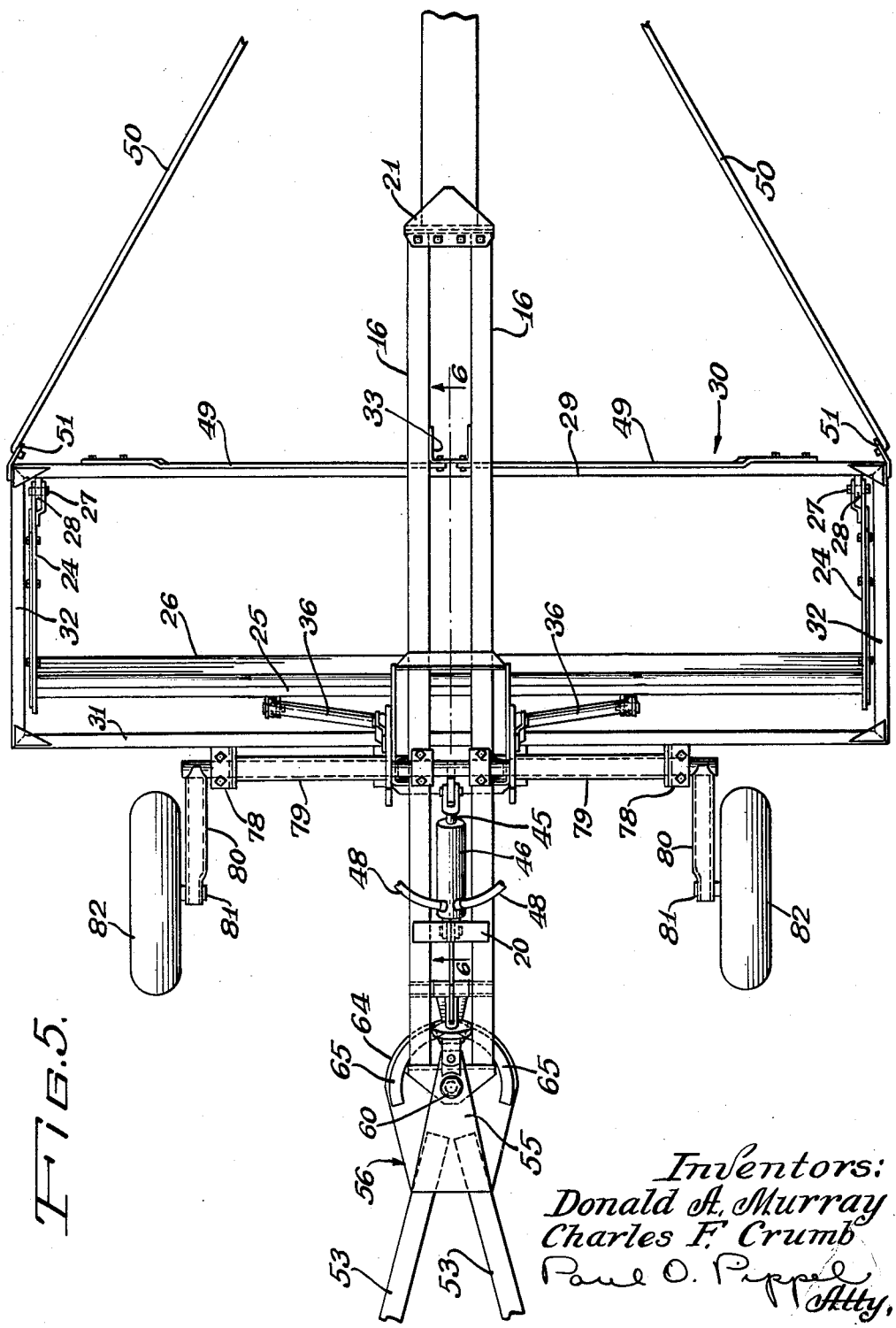

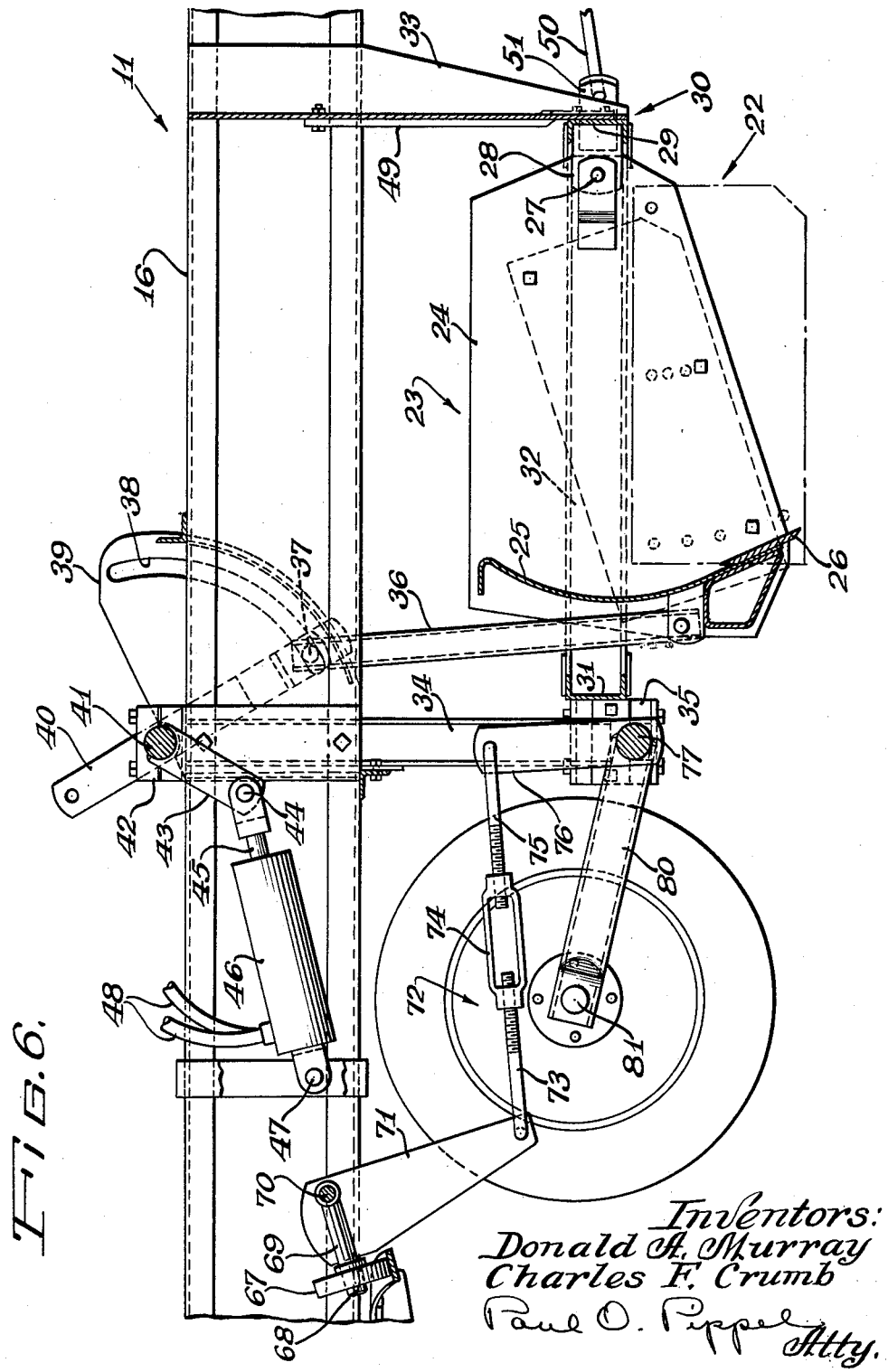

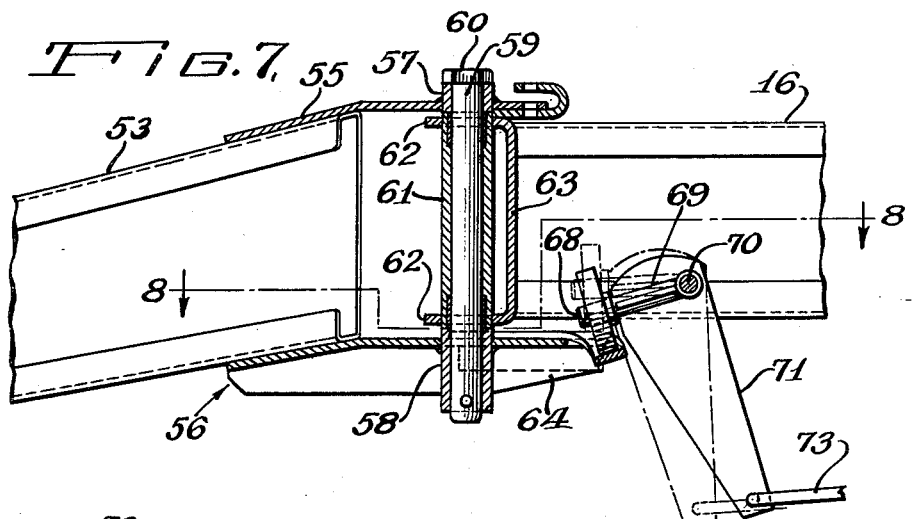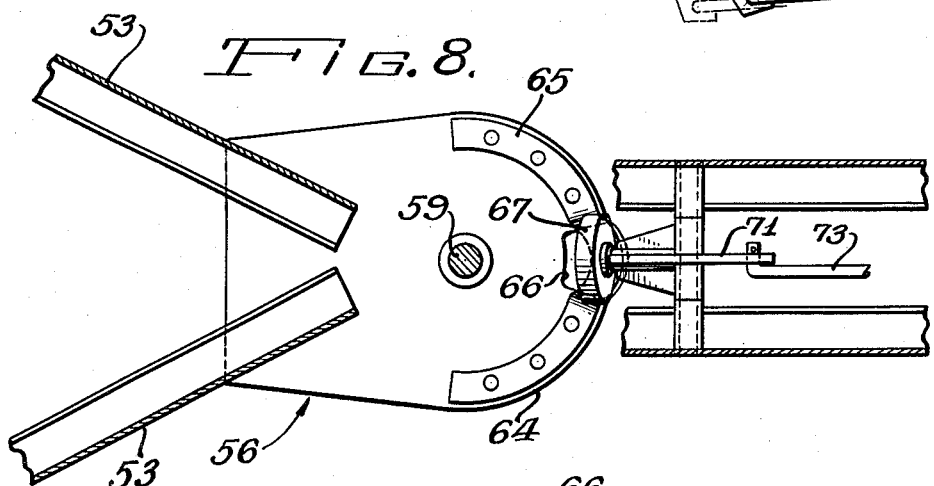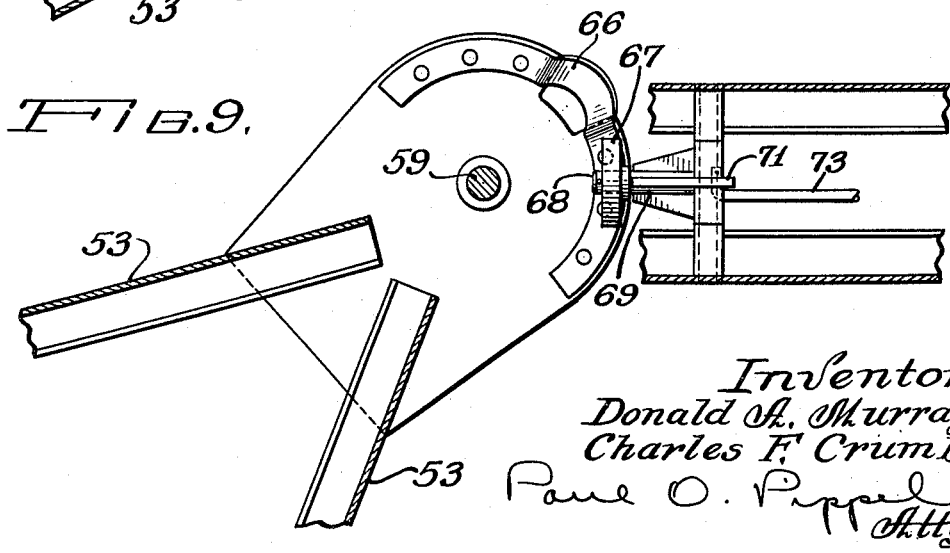

United States Patent Office 3,080,666
Patented Mar. 12, 1963

3,080,666
LAND LEVELER
Donald A. Murray and Charles F. Crumb, Stockton, Calif., assignors to International Harvester Company, Chicago, Ill., a corporation of New Jersey
Filed Nov. 9, 1960. Ser. No. 68,177
11 Claims. (Cl. 37—180)

This invention relates to earth working implements and particularly to an implement adapted to level the surface of the ground to facilitate the planting, cultivating and harvesting of crops and the like.

An implement of the type with which this invention is concerned is large and bulky and usually consists of a longitudinally elongated frame to be drawn by a tractor and having an earth-moving bucket carrying a scraper blade suspended from the rear position of the frame at such a distance behind the tractive vehicle that the penetration of the blade is not affected thereby. The front end of the frame is supported by a wheel or by the tractor, and a rear section of the frame extends some distance behind the bucket and carries a supporting wheel.

It is readily apparent that such an implement is difficult to manage, particularly where sharp turns are required, as in orchards and at the end of a field, and to make turning easier it has been proposed to pivot the tail section to facilitate making short turns. However, while facilitating turning, the lateral swinging of the tail section has unbalanced the bucket supporting main frame causing one end of the scraper blade to engage the ground. Therefore, an object of this invention is the provision of an improved land plane of the type having a pivoted tail section.

Another object of the invention is the provision of an improved land leveling or planing machine having novel means for preventing sagging of the frame and maintaining the blade above the ground when turning the implement.

Another object of the invention is the provision in a land leveling machine of the type having a pivoted tail section, of improved means for supporting the frame carrying the bucket and for actuating the supporting means by the swinging action of the tail section of the frame when turning the implement.

Another object of the invention is the provision, in a land leveling machine of the type described, of improved means for supporting an earth scraping bucket or the like from the frame and for stabilizing the frame and the bucket when turning the implement.

With these and other objects in view, the present invention contemplates the provision of novel means for mounting the bucket on the frame independently of the wheels by which the bucket is maintained level during turning of the implement, and stabilizing the bucket by providing auxiliary supporting means for the frame.

Other objects and advantages of the invention will become clear from the following detailed description when read in conjunction with the accompanying drawings wherein:

FIGURE 1 is a view in side elevation of a land leveling or scraping machine incorporating the features of this invention, connected to a tractor to be propelled thereby;

FIGURE 2 is a plan view of the machine shown in FIGURE 1;

FIGURE 3 is an enlarged detail of a portion of the structure shown in FIGURE 1 with the earth scraping blade in operating position;

FIGURE 4 is a sectional view taken on the line 4—4 of FIGURE 3;

FIGURE 5 is a plan view of the structure shown in FIGURE 3;

FIGURE 6 is a sectional view taken on the line 6—6 of FIGURE 5;

FIGURE 7 is an enlarged sectional view showing the hinged connection between the main and rear frames as well as the actuating means for stabilizing the scraper blade when turning the implement;

FIGURE 8 is a section taken on the line 8—8 of FIGURE 7 illustrating the aligned position of the main and rear frames when the implement is operating normally in a straight line; and FIGURE 9 is a detail, in section, similar to FIGURE 8 showing the position of the parts when the implement is turned and the tail section has swung laterally relative to the main frame.

FIGURES 1 and 2 give a clear indication of the longitudinal elongation of the machine of this invention. The frame structure 10 of the machine includes a main frame 11 and a rear frame or tail section 12, and the entire machine is supported by a wheel 13 at the forward end and by a pair of wheels 14 at the rear end.

Main frame 11 comprises a tubular forward section 15, and affixed thereto a rearwardly extending tool carrying section 16. A hitch member 17 curving forwardly and downwardly is secured to the front end of section 15 and the forward lower end of the hitch member is pivotally connected to the rear end of a draft bar 18 which, in turn, is pivotally connected, in a manner not shown, to the rear end of a tractor designated at 19.

The tool carrying main frame section 16 comprises a pair of laterally spaced beams which are C-shaped in cross-section connected by cross-pieces 20 and 21.

The scraper blade carrier assembly is mounted on the main frame 10 and designated by the numeral 22. A transversely extending bucket 23 includes a pair of side plates 24 and a back plate 25 which is convex and has affixed to its lower inner surface a transversely extending scraper blade 26.

The forward ends of plates 24 are pivotally mounted for vertical swinging movement upon pins 27 carried by lugs 28 affixed to and projecting rearwardly from the ends of a transversely extending channel iron 29 forming part of a rectangular bucket carrying frame 30 which includes another transverse channel 31 rearwardly of and parallel to channel 29, the two channel bars being connected at the ends by side bars 32.

Rectangular frame 30 is affixed to and made rigid with the main frame by means including a vertical hanger 33 affixed to the frame and depending therefrom and having its lower end secured to the channel member 29 centrally thereof. A pair of laterally spaced bars 34 are affixed at their upper ends to the sides of the frame members 16 and are secured at their lower ends to bearing blocks 35 which are affixed to the rear bar 31 of the bucket frame. The bucket 23 is vertically adjusted about its pivot 27 by means including a pair of struts 36 each of which is pivotally connected at its lower end to lugs affixed to the back plate 25 of the bucket. The upper ends of struts 36 carry bolts 37, each of which is slidably received in an elongated arcuate vertically extending slot 38 formed in a quadrant-shaped plate 39 secured to the frame member 16.

A lever 40 is affixed to each end of a shaft 41 rockably mounted in bearings 42 affixed to the top of the members 16. One end of each lever 40 is mounted upon bolt 37, so that, by loosening bolts 37 and rocking shaft 41, levers 40 can be swung upwardly over the quadrant 39, with bolts 37 sliding in slots 38 to raise the bucket and its earth scraping blade 26 to an inoperative position or to adjust the depth of penetration of the blade in the ground.

With bolt 37 freely slidable in slot 38, vertical adjustment of the bucket is made by the provision of a downwardly extending arm 43 affixed to shaft 41, the lower end of arm 43 being pivotally connected by a pin 44 to a piston rod 45 slidable in a hydraulic cylinder 46 pivotally anchored by a pin 47 to an upright member secured to the frame 16. Fluid under pressure is supplied by means, not shown, deriving power from the tractor 19, through hose lines 48.

Additional bracing for the bucket carrying frame 30 is provided by a pair of straps 49 connected at their upper ends to the vertical hanger 33, and at their lower ends to the front channel bar 29. A pair of forwardly converging brace rods 50 are connected at their rear ends to lugs 51 at the forward ends of side bars 32, and the forward ends of rods 50 are connected to lugs 52 affixed to the sides of the tubular frame section 15 of the main frame.

Tail section 12 of the frame comprises rearwardly diverging beams 53 connected by a cross bar 54 and carrying at their rear ends the supporting wheels 14.

The forward ends of the bars 53 of the tail section or rear frame have secured thereto a pair of vertically spaced forwardly projecting plates 55 and 56 having affixed thereto sleeves 57 and 58, respectively, rotatably mounted upon the ends of a hinge pin 59 having a head 60 at its upper end engaging the upper end of sleeve 57. A vertical sleeve 61 is secured to the flanges 62 of a channel member 63 affixed to the rear end of the main frame, and sleeve 61 is keyed to shaft 59.

The rear frame 12 follows in alignment behind the main frame 10 and the tractor. However, in turning the tractor and the implement as at the end of a field, or in orchards, due to the connection of the rear frame to the hinge pin 59, coupled with the frictional engagement of the wheels 14 with the ground, the tail section swings laterally with respect to the main frame to facilitate the operation of the implement. However, as pointed out before, this lateral swinging of the tail section causes the main frame section to become unstable, the outer end of the blade 26 digging into the ground and interfering with the proper operation of the machine.

Stabilizing means have been provided to overcome this tendency of the frame to become unbalanced on turning and this mechanism is now to be described.

The lower plate 56 has an arcuately shaped forward projection 64 having on the upper surface thereof a curved cam member 65 defining an arc on the axis of hinge pin 59 and having a central groove or depression 66 therein adapted to receive a cam follower in the form of a roller 67 rotatably mounted upon a stub shaft 68 at the end of a lever 69, the forward end of which is pivotally mounted upon a pivot pin 70 extending between the members 16 of the main frame.

Lever 69 carrying roller 67 forms one arm of a bell crank, the other arm 71 of which is affixed to the arm 69 and extends forwardly and downwardly. The lower end of arm 71 is pivotally connected to one end of a turn buckle 72 comprising a threaded rod 73 connected to the lower end of arm 71, a threaded connector 74, and another rod 75, the forward end of which is pivotally connected to the upper end of a rock arm 76, the lower end of which is affixed to a transversely extending rock shaft 77, rotatably mounted in the bearing blocks 35 and in additional bearing blocks 78 affixed to and extending rearwardly from the bar 31 of the bucket frame and to which are also secured the lower outwardly angled ends of hangers 79, the upper ends of which are affixed to the main frame of the machine.

Wheel arms in the form of crank axles 80 are affixed to the ends of the rock shaft 77, extending rearwardly therefrom, and have mounted at the ends thereof on stub shafts 81, carried by the crank arms, ground engaging gauge wheels 82.

In the normal operation of the machine in a straight line, cam follower 67 rests in the notch or groove 66 in the center between the cam faces 65. In this position the wheels 82 are held in normal gauging relation to the bucket and scraper blade, and by virtue of the mounting of the wheels upon the main frame 10 of the machine, any downward movement of the wheels 82 will tend to lift the frame of the machine and support the bucket and blade. This support is provided automatically when the machine is turned. In turning, frictional engagement of the tail section wheels 14 over the ground forces the tail section laterally about the axis of the hinge pin 59 overcoming the weight of the frame, and forces the roller 67 to ride out of the notch 66 onto one of the cam faces 65. This movement of the roller out of the notch rocks the bell crank 69, 71 in a clockwise direction, and acting through turn buckle 72 and rock arm 76 to cause wheel carrying arms 80 to move downwardly in a direction to lift the main frame 11, thus stabilizing the bucket and scraper blade and preventing the tilting of one end of the bucket toward the ground.

When the machine straightens and is again traveling in a straight line, the roller 67 again drops into the notch 66 and the weight of the machine resists the lateral swinging of the tail section.

It is believed that the construction and operation of the improved land leveling machine of this invention will be clearly understood from the foregoing description. It should likewise be understood that the invention has been described in its preferred embodiment only, and that modifications may be made therein without departing from the spirit of the invention or the scope of the appended claims.

What is claimed is:

1. In a land leveling machine, a main blade-carrying frame, a transverse rock shaft rockably mounted on the frame and having wheel-carrying crank axles affixed thereto and vertically swingable to raise and lower the wheels in response to rocking said shaft, a wheel supported rear frame, vertical axis pivot means connecting the rear frame to the main frame for lateral swinging relative thereto, and means operatively connecting siad rear frame to said rock shaft for rocking the latter in response to the lateral swinging of the rear frame, comprising a cam plate mounted on the rear frame for pivoting therewith about the axis of said pivot means, a cam follower movably mounted on the main frame engageable with the cam plate and movable in response to pivoting of said cam plate, and substantially inextensible motion transmitting means operatively connecting said cam follower to said rock shaft for rocking the latter to raise and lower said wheels in response to movement of the cam follower.

2. The invention set forth in claim 1, wherein said cam plate has a cam surface describing an arc on the axis of said pivot means, said cam follower being engageable with said cam surface during the lateral swinging of the rear frame, and said cam plate having a groove adapted to receive the cam follower, the walls of said groove forming abutments engageable with the follower to resist the lateral swinging of the rear frame.

3. The invention set forth in claim 2, wherein said cam follower is mounted on one arm of a bell crank fulcrumed on a transverse axis on the main frame, the other arm of the bell crank being operatively connected to said rock shaft to rock the latter to swing said wheel-carrying crank axles downwardly and raise the main frame.

4. The invention set forth in claim 3, wherein said means connecting the bell crank to the rock shaft includes a rock arm affixed to said shaft and a horizontal thrust rod connected at one end to said rock arm and at its other end to said other arm of the bell crank.

5. The invention set forth in claim 4, wherein said cam follower rises out of said groove into engagement with said cam surface upon lateral swinging of the rear frame to rock said bell crank and elevate the main frame, and said thrust rod is adjustable in length to vary the extent of elevation imparted to the main frame.

6. In a land leveling machine of the type including an elongated main frame having a support for its forward end and an elongated wheel-supported rear frame pivotally connected to the rear end of the main frame for lateral swinging relative thereto, the combination of an earth scraping assembly comprising a rigid auxiliary frame mounted on the main frame and depending therefrom, a blade carrier pivoted on said auxiliary frame for vertical swinging relative thereto, a crank axle rockably mounted on the auxiliary frame and having wheels mounted thereon for vertical swinging relative to the auxiliary frame and the main frame upon rocking the axle, thrust means operatively connecting said rear frame to said crank axle to rock the latter in response to lateral swinging of said rear frame, and additional means in the connection of said rear frame to said main frame operative to resist the lateral swinging of the rear frame relative to the main frame.

7. In an earth scraping machine having an elongated main frame, a transverse blade mounted thereon, and a wheel-carrying rear frame connected by vertical pivot means to the main frame to accommodate lateral swinging of the rear frame to facilitate turning the machine, the combination of means for offsetting the unbalancing of the blade-carrying main frame by the lateral swinging of the rear frame including a transverse rock shaft mounted on the main frame having wheel-carrying crank arms mounted thereon for swinging in a vertical plane upon rocking the shaft, and means operatively connecting said rear frame to said rock shaft to rock it in a direction to apply down pressure to said wheels in response to lateral swinging of the rear frame, comprising a lever pivotally mounted on the main frame for swinging in a vertical plane, actuating means carried by said rear frame engageable with said lever to swing the latter in one direction upon lateral swinging of the rear frame, and inextensible linkage operatively connecting said lever to said rock shaft to rock the latter in a direction to exert down pressure on said wheel-carrying crank arms.

8. The invention set forth in claim 7, wherein said lever is one arm of a bell crank the other arm of which is operatively connected to the rock shaft.

9. In an earth scraping machine having an elongated main frame, a transverse blade mounted thereon and a pair of wheels mounted on the main frame adjacent the ends of the blade and vertically movable to raise and lower the frame, a wheel supported tail section, and means serving as a clevis including upper and lower plates affixed to the forward end of the tail section, a vertical axis pivot pin mounted on the main frame and having pivotal connection to said upper and lower plates to accommodate lateral swinging of the tail section when turning the machine, actuating means integral with and forming a part of one of said plates and extending forwardly from said pivot pin, and substantially inextensible thrust means operatively connecting said actuating means to said pair of wheels to move them downwardly relative to the main frame to raise said main frame and said blade in response to lateral swinging of said tail section.

10. In an earth scraping machine having an elongated main frame, a transverse blade mounted thereon and a pair of wheels mounted on the main frame adjacent the ends of the blade and vertically movable to raise and lower the frame, a wheel supported tail section, and means serving as a clevis including upper and lower plates affixed to the forward end of the tail section, a vertical axis pivot pin mounted on the main frame and having pivotal connection to said upper and lower plates to accommodate lateral swinging of the tail section when turning the machine, actuating means integral with and forming a part of one of said plates and extending forwardly from said pivot pin, said actuating means including an arcuately shaped cam track, a lever pivoted on the main frame and having a cam follower mounted thereon and engageable with said cam track, said cam track including means for deflecting said cam follower and rocking said lever, and means operatively connecting said lever to said wheels to move them downwardly to raise said main frame and said blade in response to lateral swinging of said tail section.

11. In an earth scraping machine having an elongated main frame, a transverse blade mounted thereon and a pair of wheels mounted on the main frame adjacent the ends of the blade and vertically movable to raise and lower the frame, a wheel supported tail section, and means serving as a clevis including upper and lower plates affixed to the forward end of the tail section, a vertical axis pivot pin mounted on the main frame and having pivotal connection to said upper and lower plates to accommodate lateral swinging of the tail section when turning the machine, actuating means integral with and forming a part of one of said plates and extending forwardly from said pivot pin, said actuating means including an arcuately shaped cam track having a groove therein, a lever pivoted on the main frame and having a cam follower mounted thereon and receivable in said groove when said tail section is in alignment with said main frame, said follower being forced upwardly out of said groove against the weight of the frame upon lateral swinging of the tail section to rock said lever, and means operatively connecting said lever to said wheels to press them downwardly relative to main frame and the blade to support the latter upon rocking said lever.

References Cited in the file of this patent

UNITED STATES PATENTS

| | | |
|---|---|---|
| 466,284 | Swager | Dec. 29, 1891 |
| 1,780,955 | Toth | Nov. 11, 1930 |
| 2,164,963 | Taylor | July 4, 1939 |
| 2,792,651 | Hobday | May 21, 1957 |
| 2,842,874 | Shumaker et al. | July 15, 1958 |
| 2,893,140 | Gurries | July 7, 1959 |
| 2,898,125 | Burch | Aug. 4, 1959 |
| 2,969,692 | Pfarrwaller | Jan. 31, 1961 |